US010075362B2

(12) United States Patent
Yu et al.

(10) Patent No.: US 10,075,362 B2
(45) Date of Patent: Sep. 11, 2018

(54) METHOD AND APPARATUS FOR DETERMINING NEXT HOP AND ADVERTISING ROUTING INFORMATION

(71) Applicant: Huawei Technologies Co., Ltd., Shenzhen (CN)

(72) Inventors: Fengqing Yu, Shenzhen (CN); Tao Bai, Shenzhen (CN); Shunwan Zhuang, Shenzhen (CN); Lili Wang, Shenzhen (CN); Yuanbin Ouyang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 14/939,880

(22) Filed: Nov. 12, 2015

(65) Prior Publication Data
US 2016/0072695 A1  Mar. 10, 2016

Related U.S. Application Data

(63) Continuation of application No. PCT/CN2014/077574, filed on May 15, 2014.

(30) Foreign Application Priority Data

May 15, 2013 (CN) .......................... 2013 1 0178948

(51) Int. Cl.
*H04L 12/721* (2013.01)
*H04L 12/751* (2013.01)
(Continued)

(52) U.S. Cl.
CPC .............. *H04L 45/02* (2013.01); *H04L 45/24* (2013.01); *H04L 45/42* (2013.01); *H04L 45/74* (2013.01)

(58) Field of Classification Search
None
See application file for complete search history.

(56) References Cited

U.S. PATENT DOCUMENTS 8,755,389 B1 * 6/2014 Poutievski ............ H04L 45/245
370/395.31
9,191,318 B1 * 11/2015 Van De Velde ........ H04L 12/66
(Continued)

FOREIGN PATENT DOCUMENTS

CN          1697408 A     11/2005
CN        101340293 A      1/2009
(Continued)

*Primary Examiner* — Duc T Duong
(74) *Attorney, Agent, or Firm* — Leydig, Voit & Mayer, Ltd.

(57) ABSTRACT

Embodiments of the present application disclose a method and an apparatus for determining a next hop and advertising routing information, which relate to the field of communications and are used for reducing operation complexity of a forwarding device and reducing network maintenance workload. The method for determining the next hop provided by the embodiments of the present application includes: receiving, by a control device, first routing information sent by a first forwarding device, where the first routing information includes an identifier of the first forwarding device; determining a first routing path according to the identifier of the first forwarding device, an identifier of a second forwarding device and a routing path group; and determining a next hop in second routing information for the second forwarding device according to the first routing path, where the second forwarding device is a receiver of the second routing information advertised by the control device.

16 Claims, 4 Drawing Sheets

(51) Int. Cl.
*H04L 12/707* (2013.01)
*H04L 12/741* (2013.01)
*H04L 12/717* (2013.01)

(56) References Cited

U.S. PATENT DOCUMENTS

| | | | | |
|---|---|---|---|---|
| 2003/0174653 | A1* | 9/2003 | Basu | H04L 45/02 370/238 |
| 2003/0204619 | A1* | 10/2003 | Bays | H04L 41/0253 709/238 |
| 2006/0029035 | A1* | 2/2006 | Chase | H04L 45/02 370/351 |
| 2007/0162614 | A1* | 7/2007 | Patel | H04L 45/00 709/239 |
| 2008/0101392 | A1 | 5/2008 | Zhang et al. | |
| 2010/0220736 | A1* | 9/2010 | Mohapatra | H04L 45/04 370/401 |
| 2012/0093154 | A1* | 4/2012 | Rosenberg | H04L 45/04 370/392 |
| 2012/0213218 | A1* | 8/2012 | Yilmaz | H04L 45/02 370/351 |
| 2012/0213225 | A1* | 8/2012 | Subramanian | H04L 45/50 370/392 |
| 2013/0176845 | A1* | 7/2013 | Olofsson | H04L 45/22 370/225 |

FOREIGN PATENT DOCUMENTS

| | | |
|---|---|---|
| CN | 101668324 A | 3/2010 |
| CN | 102209020 A | 10/2011 |
| JP | 2012044379 A | 3/2012 |

* cited by examiner

METHOD AND APPARATUS FOR DETERMINING NEXT HOP AND ADVERTISING ROUTING INFORMATION

CROSS-REFERENCE TO RELATED APPLICATIONS

This application is a continuation of International Patent Application No. PCT/CN2014/077574, filed on May 15, 2014, which claims priority to Chinese Patent Application No. 201310178948.1, filed on May 15, 2013, both of which are hereby incorporated by reference in their entireties.

TECHNICAL FIELD

The present application relates to the field of communications, and in particular, to a method and an apparatus for determining a next hop and advertising routing information.

BACKGROUND

A border gateway protocol (BGP) is a dynamic routing protocol and may be used for exchanging routing information in an autonomous system (AS). The AS includes multiple routers. Two routers in a same AS exchange the routing information via an internal BGP (IBGP) to create a flow path, specifically, the flow path is created through change of a next hop in the routing information, where their connection relationship is called an IBGP connection.

In general, all the routers in the AS are interconnected, for example, if one AS includes n routers, n (n−1)/2 IBGP connections are needed. Thus, when n is larger, a lot of network resources and management organization resources need to be consumed to achieve the IBGP connection. In order to reduce resource consumption, a certain router in one AS is usually used as a reflection router, other part or all of the routers are used as clients, each client establishes the IBGP connection with the reflection router, the reflection router reflects the routing information between the clients, the clients establish no IBGP connection with each other, and interconnection of all the routers in the same AS is achieved by the reflection router. It should be noted that all routers mentioned below do not include the reflection router and are used as the clients.

In the above-mentioned case of interconnecting all the routers in the same AS through the reflection router, after routing information sent by one router to the reflection router is reflected, a next hop in the routing information is an identifier of the router, and the next hop in the routing information cannot be changed. Currently, in this case, an outbound policy is generally configured on the router to determine the next hop in the routing information. However, this method is used for determining the next hop at the router side, resulting in complicated operation of the router; the outbound policy needs to be configured on each router, resulting in large network maintenance workload.

SUMMARY

Embodiments of the present application provide a method and an apparatus for determining a next hop and advertising routing information, which is used for reducing operation complexity of a forwarding device and reducing network maintenance workload.

To achieve the above-mentioned objectives, the embodiments of the present application adopt the following technical solutions:

In a first aspect, a method for determining a next hop is provided, including:

receiving, by a control device, first routing information sent by a first forwarding device, where the first routing information includes an identifier of the first forwarding device;

determining a first routing path according to the identifier of the first forwarding device, an identifier of a second forwarding device and a routing path group; and determining a next hop in second routing information for the second forwarding device according to the first routing path, where the second forwarding device is a receiver of the second routing information advertised by the control device.

In combination with the first aspect, in a first possible implementation manner, the determining the next hop in the second routing information for the second forwarding device according to the first routing path, includes:

determining an identifier of an adjacent node before the second forwarding device on the first routing path as the next hop in the second routing information for the second forwarding device.

In combination with the first aspect or the first possible implementation manner of the first aspect, in a second possible implementation manner, the determining the first routing path according to the identifier of the first forwarding device, the identifier of the second forwarding device and the routing path group, includes:

selecting a routing path including the identifier of the first forwarding device and the identifier of the second forwarding device in the routing path group as the first routing path.

In combination with the first aspect, in a third possible implementation manner, before the determining the first routing path according to the identifier of the first forwarding device, the identifier of the second forwarding device and the routing path group, the method further includes:

determining the routing path group according to a network topology within a preset range.

In combination with the third possible implementation manner of the first aspect, in a fourth possible implementation manner, the determining the routing path group according to the network topology within the preset range, includes:

determining the routing path group according to the network topology within the preset range and a constraint condition, where the constraint condition includes path length constraint or bandwidth constraint.

In combination with the third possible implementation manner of the first aspect, in a fifth possible implementation manner, when the network topology within the preset range is updated, the determining the routing path group according to the network topology within the preset range, includes:

determining the routing path group according to the updated network topology.

In a second aspect, a method for advertising routing information is provided, including:

receiving, by a control device, first routing information sent by a first forwarding device, where the first routing information includes an identifier of the first forwarding device;

determining a first routing path according to the identifier of the first forwarding device, an identifier of a second forwarding device and a routing path group;

determining a next hop in second routing information for the second forwarding device according to the first routing path; and obtaining the second routing information for the second forwarding device at least according to the next hop in the second routing information for the second forwarding device, and advertising the second routing information for the second forwarding device to the second forwarding device.

In combination with the second aspect, in a first possible implementation manner, the determining the next hop in the second routing information for the second forwarding device according to the first routing path, includes:

determining an identifier of an adjacent node before the second forwarding device on the first routing path as the next hop in the second routing information for the second forwarding device.

In a third aspect, an apparatus for determining a next hop is provided, including:

a receiving unit, configured to receive first routing information sent by a first forwarding device, where the first routing information includes an identifier of the first forwarding device;

a routing path determining unit, configured to determine a first routing path according to the identifier of the first forwarding device transmitted by the receiving unit, an identifier of a second forwarding device and a routing path group; and a next hop determining unit, configured to determine a next hop in second routing information for the second forwarding device according to the first routing path transmitted by the routing path determining unit, where the second forwarding device is a receiver of the second routing information advertised by the apparatus.

In combination with the third aspect, in a first possible implementation manner, the next hop determining unit is specifically configured to determine an identifier of an adjacent node before the second forwarding device on the first routing path as the next hop in the second routing information for the second forwarding device.

In combination with the third aspect or the first possible implementation manner of the third aspect, in a second possible implementation manner, the routing path determining unit is specifically configured to select a routing path including the identifier of the first forwarding device and the identifier of the second forwarding device in the routing path group as the first routing path.

In combination with the third aspect, in a third possible implementation manner, the apparatus further includes:

a routing path group determining unit, configured to determine the routing path group according to a network topology within a preset range.

In combination with the third possible implementation manner of the third aspect, in a fourth possible implementation manner, the routing path group determining unit is specifically configured to determine the routing path group according to the network topology within the preset range and a constraint condition, where the constraint condition includes path length constraint or bandwidth constraint.

In combination with the third possible implementation manner of the third aspect, in a fifth possible implementation manner, the routing path group determining unit is specifically configured to determine the routing path group according to the updated network topology, when the network topology within the preset range is updated.

In a fourth aspect, an apparatus for advertising routing information is provided, including:

a receiving unit, configured to receive first routing information sent by a first forwarding device, where the first routing information includes an identifier of the first forwarding device;

a routing path determining unit, configured to determine a first routing path according to the identifier of the first forwarding device transmitted by the receiving unit, an identifier of a second forwarding device and a routing path group;

a next hop determining unit, configured to determine a next hop in second routing information for the second forwarding device according to the first routing path transmitted by the routing path determining unit;

a routing information determining unit, configured to obtain the second routing information for the second forwarding device at least according to the next hop in the second routing information for the second forwarding device transmitted by the next hop determining unit; and a sending unit, configured to advertise the second routing information for the second forwarding device transmitted by the routing information determining unit to the second forwarding device.

In combination with the fourth aspect, in a first possible implementation manner, the next hop determining unit is specifically configured to determine an identifier of an adjacent node before the second forwarding device on the first routing path as the next hop in the second routing information for the second forwarding device.

According to the method and apparatus for determining the next hop provided by the embodiments of the present application, the next hop in the second routing information for the receiver is determined according to the identifier of the sender of the first routing information, the identifier of the receiver and the routing path group, such that the next hop is determined at the control device side according to the routing path; according to the method and apparatus for advertising routing information provided by the embodiments of the present application, the second routing information for the receiver is sent to the receiver, the second routing information for the receiver includes the next hop in the second routing information for the receiver, and the routing information is advertised at the control device side according to the routing path; the operation complexity of the forwarding device is reduced, and operation and maintenance workload is reduced. The problems of complicated operation of the forwarding device and large network maintenance workload caused by determining the next hop at the forwarding device side in the prior art are solved.

DESCRIPTION OF EMBODIMENTS

An exemplary description of a method and an apparatus for advertising routing information provided by embodiments of the present application will be given below in combination with the accompanying drawings.

Figure 1:
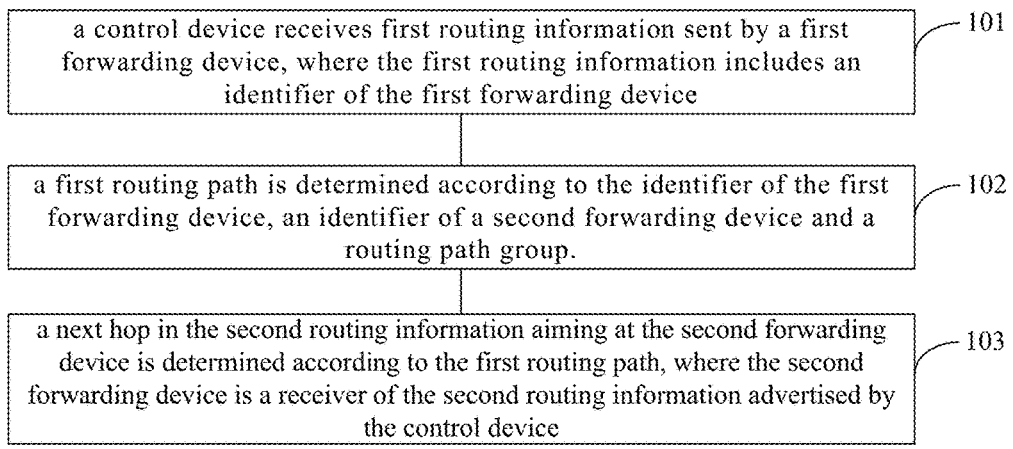
FIG. 1 is a flowchart of a method for determining a next hop provided by an embodiment of the present application.

In an aspect, as shown in FIG. 1, a method for determining a next hop provided by an embodiment of the present invention, includes:

101. a control device receives first routing information sent by a first forwarding device, where the first routing information includes an identifier of the first forwarding device.

Exemplarily, the method for determining the next hop provided by the embodiment of the present application may be applied to an AS and may be especially applicable to such scenes as exchanging routing information, advertising routing information or creating flow paths and the like in the AS, and since the scene of advertising routing information and the scene of creating flow paths may be both based on the scene of exchanging routing information, illustrations are given in the following embodiments with the method for determining the next hop in the scene of exchanging routing information as an example.

An AS may include one reflection router and several routers (clients), the reflection router and the router in the AS may exchange routing information via IBGP, and their connection relationship is called IBGP connection. A router at the edge of an AS may be called an edge router, edge routers respectively belonging to different ASs may exchange the routing information via an external BGP (External BGP, referred to as EBGP), and their connection relationship is called EBGP connection.

The control device may be a reflection router in an AS; the first forwarding device may be a router in an AS where the control device is located. In the scene of exchanging the routing information in the AS, the first forwarding device may be any router in an AS where the control device is located; in the scene of exchanging the routing information between ASs, for example, the control device belongs to an AS0, in the scene of exchanging the routing information between the AS0 and an AS1, the first forwarding device may be any edge device in the AS0 and associated with the AS1 (for example, may be associated through the EBGP connection).

The identifier of the first forwarding device may be an address of the first forwarding device or other information capable of uniquely identifying the first forwarding device. A preset range may be set in the control device, and the control device may obtain a network topology composed of all nodes within the preset range, where all the nodes within the preset range do not include the network device in general.

The first routing information further includes a next hop for the first forwarding device, and the next hop for the first forwarding device may be an identifier of any node within the preset range, where in the scene of exchanging the routing information in the AS, the next hop for the first forwarding device may be an identifier of any router in the AS; in the scene of exchanging the routing information between ASs, the next hop for the first forwarding device may be an identifier of an edge router in any other AS associated with an edge router in the AS.

102. a first routing path is determined according to the identifier of the first forwarding device, an identifier of a second forwarding device and a routing path group.

Exemplarily, the second forwarding device is a forwarding device excluding the first forwarding device in the AS to which the control device belongs.

It should be noted that, since a flow direction is opposite to a routing direction, a path in an opposite direction of a flow path may be called a routing path. The routing path group may include multiple routing paths, and the routing path is composed of identifiers of multiple nodes within the preset range.

Optionally, step 102 may include: selecting a routing path including the identifier of the first forwarding device and the identifier of the second forwarding device in the routing path group as the first routing path.

Optionally, the control device may select a routing path including the identifier of the first forwarding device and the identifier of the second forwarding device in a pre-stored routing path group as the first routing path.

Optionally, before step 102, the method may further include: determining the routing path group according to a network topology within a preset range.

Exemplarily, a routing path between any two nodes is obtained according to a network topology and a preset rule, where the preset rule includes: an identifier of any other node excluding an end node only belongs to one routing path, or the like, where the end node refers to nodes at both ends of one routing path.

According to the above-mentioned preset rule, one routing path may be matched in the routing path group by determining identifiers of two nodes, namely, a routing path may be matched by selecting the identifier of the first forwarding device and the identifier of the second forwarding device, and the routing path is used as the first routing path.

Further optionally, the determining the routing path group according to the network topology within the preset range may include: determining the routing path group according to the network topology within the preset range and a constraint condition, where the constraint condition includes path length constraint or bandwidth constraint.

Exemplarily, in the network topology, multiple routing paths may exist between any two nodes, so that when determining the routing path between two nodes according to the network topology, some constraint conditions may be added to obtain a routing path expected by a user. Optionally, the constraint condition may include path length constraint or bandwidth constraint, etc. For example, the routing path with a shortest path between the two nodes may be obtained in the network topology according to the path length constraint, or the routing path with a highest bandwidth between the two nodes is obtained in the network topology according to the bandwidth constraint.

Multiple routing paths obtained in the network topology within the preset range according to the constraint condition form the routing path group. In this case, the first routing path matched in the routing path group is the routing path between two certain nodes expected by the user.

Further, the method may further include: obtaining the network topology within the preset range, which specifically includes the following conditions:

A first condition: the preset range only includes a first AS to which the control device belongs i) obtaining an internal network topology of the first AS within the preset range; and ii) taking the internal network topology as the network topology within the preset range.

A second condition: the preset range not only includes a first AS, but also includes a second AS i) obtaining an internal network topology of the first AS within the preset range;

ii) obtaining an external network topology formed by edge devices of the second AS and the second AS; and iii) generating a whole network topology from the internal network topology and the external network topology, and taking the whole network topology as the network topology within the preset range.

Exemplarily, in the embodiment of the present application, the method for obtaining the network topology is not limited, for example, the internal network topology may be gathered via an interior gateway protocol (IGP), and the external network topology may be collectively generated by user configuration and BGP routing, etc.

Further optionally, when the network topology within the preset range is updated, the determining the routing path group according to the network topology within the preset range, includes: determining the routing path group according to the updated network topology.

Exemplarily, the control device may periodically obtain the network topology, when the network topology is updated which is caused by node change (a certain node is added/deleted) in the network topology, attribute change of the network topology, path status change or the like, the control device may update the routing path group according to the updated network topology, in order to update the first routing path. In the solution, the control device may automatically set the next hop for the second forwarding device according to dynamic change of the routing path.

103. a next hop in the second routing information for the second forwarding device is determined according to the first routing path, where the second forwarding device is a receiver of the second routing information advertised by the control device.

Specifically, step 103 may include: determining an identifier of an adjacent node before the second forwarding device on the first routing path as the next hop in the second routing information for the second forwarding device.

Exemplarily, it is assumed that the identifier of the first forwarding device is a router 1, and the routing path group includes: a routing path 1: router 1-router 3-router 4; a routing path 2: router 1-router 2-router 5. Then, the second routing information advertised by the control device includes the following conditions:

A) when the control device advertises the second routing information to the router 2, the router 2 is the second forwarding device, the routing path 2 is the first routing path, and the next hop in the second routing information for the router 2 is the router 1;

B) when the control device advertises the second routing information to the router 3, the router 3 is the second forwarding device, the routing path 1 is the first routing path, and the next hop in the second routing information for the router 3 is the router 1;

C) when the control device advertises the second routing information to the router 4, the router 4 is the second forwarding device, the routing path 1 is the first routing path, and the next hop in the second routing information for the router 4 is the router 3;

D) when the control device advertises the second routing information to the router 5, the router 5 is the second forwarding device, the routing path 2 is the first routing path, and the next hop in the second routing information for the router 5 is the router 2.

The control device may simultaneously or successively advertise the second routing information to the router 2, the router 3, the router 4 and the router 5.

According to the method for determining the next hop provided by the embodiment of the present application, the control device determines the next hop in the second routing information for the receiver according to the identifier of the sender of the first routing information, the identifier of the receiver and the routing path group, such that the next hop is determined at the control device side according to the routing path, which reduces operation complexity of the forwarding device and reduces operation and maintenance workload. The problems of complicated operation of the forwarding device and large network maintenance workload caused by determining the next hop at the forwarding device side in the prior art are solved.

The above-mentioned method is illustrated below in detail via two specific embodiments:

Embodiment 1

In the embodiment, it is taken as an example for illustration that routing information is exchanged between ASs, where a forwarding device is a router (client), a control device is a reflection router, the routing information is exchanged in the AS through IBGP, and the routing information is exchanged between ASs through EBGP.

Figure 2:
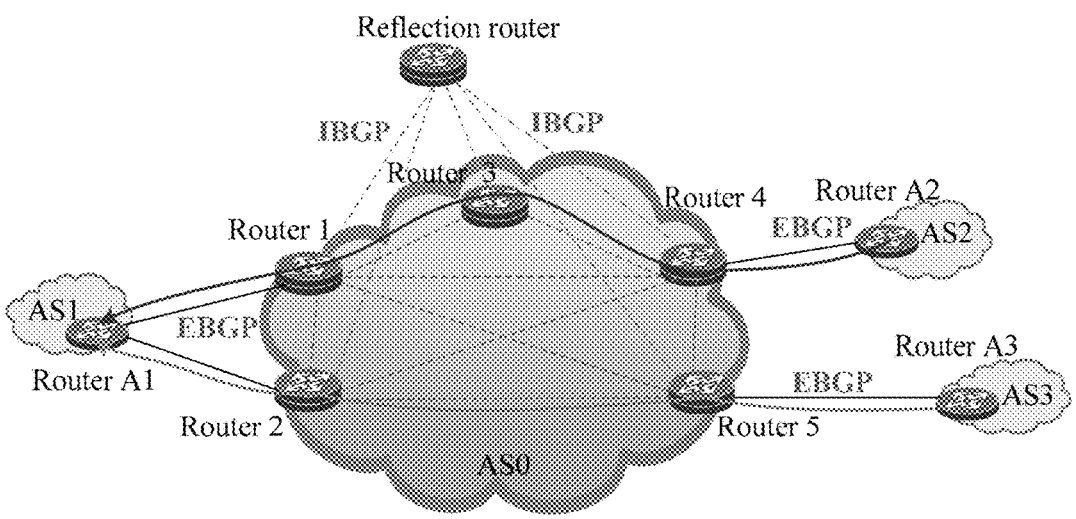
FIG. 2 is a schematic diagram of a structure of the relationship between devices in an AS provided by an embodiment of the present application.

As shown in FIG. 2, a preset range includes AS0, AS1, AS2, AS3, an identifier of an AS to which a reflection router belongs is the AS0, the AS0 includes: the reflection router, a router 1, a router 2, . . . , a router 5, and the router 1, the router 2, . . . , the router 5 are all edge routers; an edge device of the AS1 is a router A1; an edge device of the AS2 is a router A2; an edge device of the AS3 is a router A3.

Figure 3:
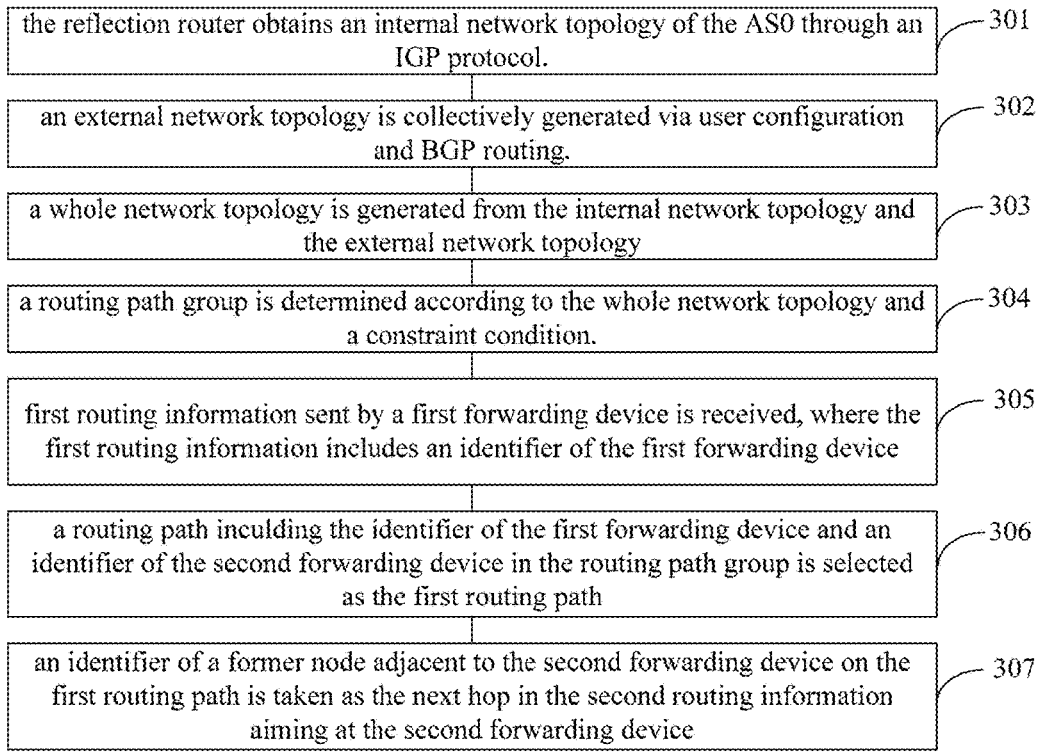
FIG. 3 is a flowchart of another method for determining a next hop provided by an embodiment of the present application.

As shown in FIG. 3, the method includes:

301. the reflection router obtains an internal network topology of the AS0 through an IGP protocol.

Exemplarily, the internal network topology is 5 nodes and a connection relationship thereof, which are specifically the router 1, the router 2, . . . , the router 5, and for the connection relationship of the five nodes, please refer to dotted line parts in FIG. 2.

302. an external network topology is collectively generated via user configuration and BGP routing.

Exemplarily, it is mainly to determine the connection relationship between the edge routers in the AS (AS1, AS2, AS3) excluding the AS0 within the preset range and the edge devices in the AS0. The external network topology may be the router 1, the router 2, . . . , the router 5, the router A1, the router A2 and the router A3; the router A1 is respectively connected with the router and the router 2; the router A2 is connected with the router 4; and the router A3 is connected with the router 5.

303. a whole network topology is generated from the internal network topology and the external network topology.

Exemplarily, the whole network topology is: 8 nodes and the connection relationship thereof, which are specifically as follows: the router A1, the router A2, the router A3, the router 1, the router 2, . . . , the router 5, and the connection relationship thereof.

304. a routing path group is determined according to the whole network topology and a constraint condition.

Exemplarily, the constraint condition may include path length constraint or bandwidth constraint, etc. It is assumed that the determined routing path group includes:

a routing path 1: router A1-router 1-router 3-router 4-router A2;

a routing path 2: router A1-router 2-router 5-router A3.

305. first routing information sent by a first forwarding device is received, where the first routing information includes an identifier of the first forwarding device.

Exemplarily, the first forwarding device is any router in the AS0, and for the scene of exchanging the routing information between ASs, the first forwarding device is an edge router associated with the AS1, the AS2 and the AS3 within the preset range. With exchanging the routing information between the AS1 and the AS0 as an example, the first forwarding device may be the router 1 or the router 2.

306. a routing path including the identifier of the first forwarding device and an identifier of the second forwarding device in the routing path group is selected as the first routing path.

Exemplarily, the second forwarding device may be any router excluding the first forwarding device in the AS0, and when the second forwarding device is the router 3 and the router 5, the first routing path is the routing path 1; when the second forwarding device is the router 4, the first routing path is the routing path 2.

307. an identifier of an adjacent node before the second forwarding device on the first routing path is taken as the next hop in the second routing information for the second forwarding device.

Exemplarily, the second forwarding device may be the router 3, the router 4 and the router 5, the next hop in the second routing information for the router 3 is the router 1, the next hop in the second routing information for the router 4 is the router 3, and the next hop in the second routing information for the router 5 is the router 2.

Embodiment 2

In the embodiment, it is taken as an example for illustration that routing information is exchanged between ASs, where a forwarding device is a router (client), a control device is a reflection router, and the routing information is exchanged in an AS through IBGP.

Compared with embodiment 1, this embodiment does not include step 302 and step 303, in step 304, a routing path group is determined according to an internal network topology and a constraint condition.

Exemplarily, it is assumed that an identifier of a first forwarding device is a router 1, and the routing path group includes: a routing path 1: router 1-router 3-router 4; a routing path 2: router 1-router 2-router 5. Then, second routing information advertised by the control device includes the following conditions:

A) when a second forwarding device is the router 2, a first routing path is the routing path 2, and a next hop in the second routing information for the router 2 is the router 1;

B) when a second forwarding device is the router 3, a first routing path is the routing path 1, and a next hop in the second routing information for the router 3 is the router 1;

C) when a second forwarding device is the router 4, a first routing path is the routing path 1, and a next hop in the second routing information for the router 4 is the router 3;

D) when a second forwarding device is the router 5, a first routing path is the routing path 2, and a next hop in the second routing information for the router 5 is the router 2.

According to the method for determining the next hop provided by the embodiment of the present application, the control device determines the next hop in the second routing information for the receiver according to the identifier of the sender of the first routing information, the identifier of the receiver and the routing path group, such that the next hop is determined at the control device side according to the routing path, which reduces operation complexity of the forwarding device and reduces operation and maintenance workload. The problems of complicated operation of the forwarding device and large network maintenance workload caused by determining the next hop at the forwarding device side in the prior art are solved.

Figure 4:
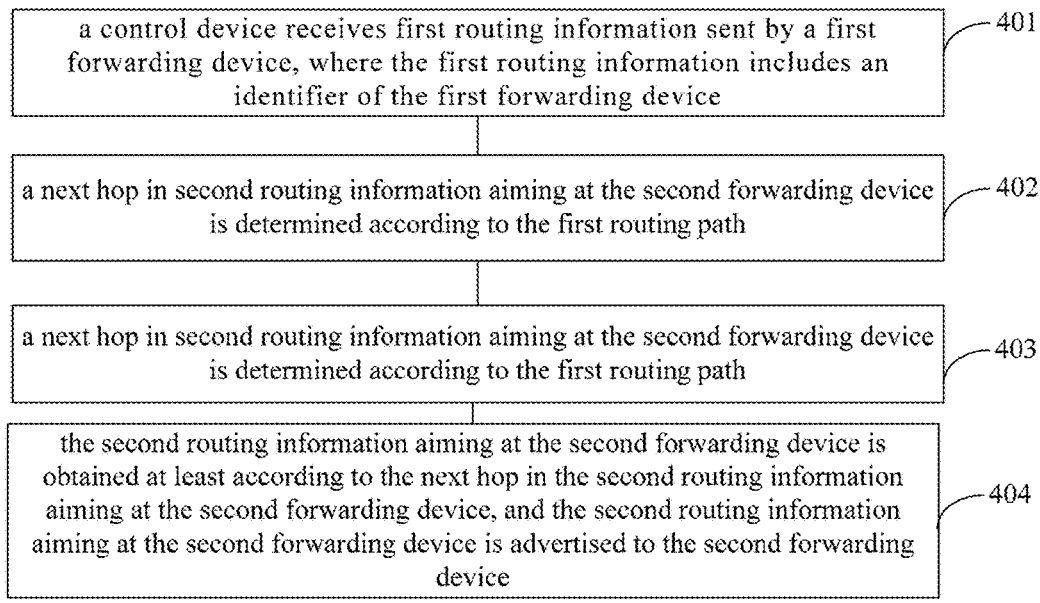
FIG. 4 is a flowchart of a method for advertising routing information provided by an embodiment of the present application.

In an aspect, as shown in FIG. 4, a method for advertising routing information provided by an embodiment of the present invention, includes:

401. a control device receives first routing information sent by a first forwarding device, where the first routing information includes an identifier of the first forwarding device.

402. a first routing path is determined according to the identifier of the first forwarding device, an identifier of a second forwarding device and a routing path group.

403. a next hop in second routing information for the second forwarding device is determined according to the first routing path.

Specifically, step 403 may include: determining an identifier of an adjacent node before the second forwarding device on the first routing path as the next hop in the second routing information for the second forwarding device.

404. the second routing information for the second forwarding device is obtained at least according to the next hop in the second routing information for the second forwarding device, and the second routing information for the second forwarding device is advertised to the second forwarding device.

Exemplarily, related contents in the embodiment may refer to the above-mentioned embodiment, and they will not be repeated redundantly herein. The second routing information for the second forwarding device may include the next hop, a prefix, an AS attribute and the like of the second routing information for the second forwarding device.

According to the method for advertising routing information provided by the embodiment of the present application, the control device determines the next hop in the second routing information for the receiver according to the identifier of the sender of the first routing information, the identifier of the receiver and the routing path group, and sends the second routing information for the receiver to the receiver, and the second routing information for the receiver includes the next hop in the second routing information for the receiver, so that the next hop is determined at the control device side according to the routing path, and then the routing information is advertised at the control device side according to the routing path, which reduces operation complexity of the forwarding device and reduces operation and maintenance workload. The problems of complicated operation of the forwarding device and large network maintenance workload caused by determining the next hop at the forwarding device side in the prior art are solved.

Figure 5:
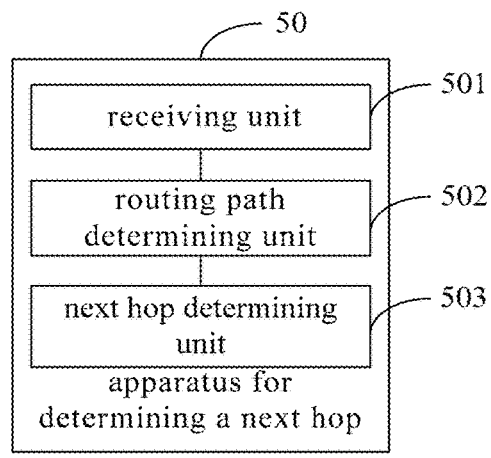
FIG. 5 is a schematic diagram of a structure of an apparatus for determining a next hop provided by an embodiment of the present application.

In an aspect, as shown in FIG. 5, an apparatus 50 for determining a next hop provided by an embodiment of the present invention is used for implementing the method for determining the next hop as shown in FIG. 1, and the apparatus 50 includes:

a receiving unit 501, configured to receive first routing information sent by a first forwarding device, where the first routing information includes an identifier of the first forwarding device;

a routing path determining unit 502, configured to determine a first routing path according to the identifier of the first forwarding device transmitted by the receiving unit 501, an identifier of a second forwarding device and a routing path group; and a next hop determining unit 503, configured to determine a next hop in the second routing information for the second forwarding device according to the first routing path transmitted by the routing path determining unit 502, where the second forwarding device is a receiver of the second routing information advertised by the apparatus.

Further, the next hop determining unit 503 may be specifically configured to determine an identifier of an adjacent node before the second forwarding device on the first routing path as the next hop in the second routing information for the second forwarding device.

Further, the routing path determining unit 502 may be specifically configured to, select a routing path including the identifier of the first forwarding device and the identifier of the second forwarding device in the routing path group as the first routing path.

Figure 6:
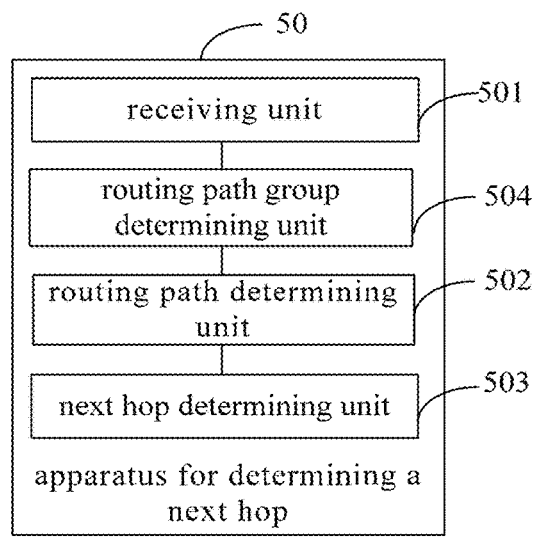
FIG. 6 is a schematic diagram of a structure of another apparatus for determining a next hop provided by an embodiment of the present application.

Optionally, as shown in FIG. 6, the apparatus 50 may further include:

a routing path group determining unit 504, configured to determine the routing path group according to a network topology within a preset range.

Optionally, the routing path group determining unit 504 is specifically configured to determine the routing path group according to the network topology within the preset range and a constraint condition, where the constraint condition includes path length constraint or bandwidth constraint.

Optionally, the routing path group determining unit 504 is specifically configured to determine the routing path group according to the updated network topology, when the network topology within the preset range is updated.

According to the apparatus for determining the next hop provided by the embodiment of the present application, by determining the next hop in the second routing information for the receiver according to the identifier of the sender of the first routing information, the identifier of the receiver and the routing path group, the next hop is determined at the control device side according to the routing path, which reduces operation complexity of the forwarding device and reduces operation and maintenance workload. The problems of complicated operation of the forwarding device and large network maintenance workload caused by determining the next hop at the forwarding device side in the prior art are solved.

Figure 7:
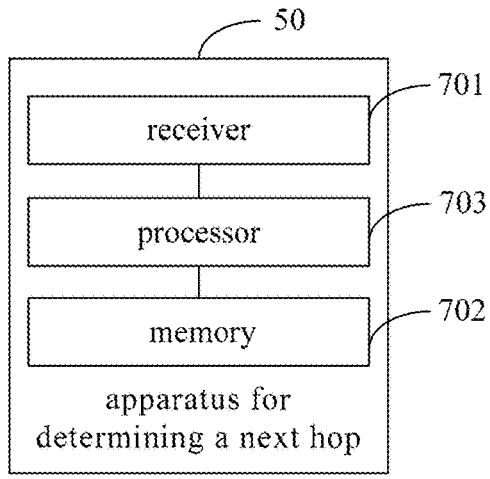
FIG. 7 is a schematic diagram of a structure of another apparatus for determining a next hop provided by an embodiment of the present application.

In an aspect, as shown in FIG. 7, an apparatus 50 for determining a next hop provided by an embodiment of the present invention is used for implementing the method for determining the next hop as shown in FIG. 1, and the apparatus 50 includes a receiver 701, a memory 702 and a processor 703 respectively connected with the receiver 701 and the memory 702, where, the receiver 701 is configured to receive first routing information sent by a first forwarding device, where the first routing information includes an identifier of the first forwarding device;

the memory 702 is configured to store a group of codes, where the codes are used for controlling the processor 703 to perform the following operations:

determining a first routing path according to the identifier of the first forwarding device, an identifier of a second forwarding device and a routing path group; and determining a next hop in second routing information for the second forwarding device according to the first routing path, where the second forwarding device is a receiver of the second routing information advertised by the apparatus 50.

Furthermore, the processor 703 may be specifically configured to determine an identifier of an adjacent node before the second forwarding device on the first routing path as the next hop in the second routing information for the second forwarding device.

Further, the processor 703 may be specifically configured to select a routing path including the identifier of the first forwarding device and the identifier of the second forwarding device in the routing path group as the first routing path.

Further, the processor 703 may be further configured to determine the routing path group according to a network topology within a preset range.

Optionally, the processor 703 may be specifically configured to determine the routing path group according to the network topology within the preset range and a constraint condition, where the constraint condition includes path length constraint or bandwidth constraint.

Optionally, the processor 703 may be specifically configured to determine the routing path group according to the updated network topology, when the network topology within the preset range is updated.

According to the apparatus for determining the next hop provided by the embodiment of the present application, by determining the next hop in the second routing information for the receiver according to the identifier of the sender of the first routing information, the identifier of the receiver and the routing path group, the next hop is determined at the control device side according to the routing path, which reduces operation complexity of the forwarding device and reduces operation and maintenance workload. The problems of complicated operation of the forwarding device and large network maintenance workload caused by determining the next hop at the forwarding device side in the prior art are solved.

Figure 8:
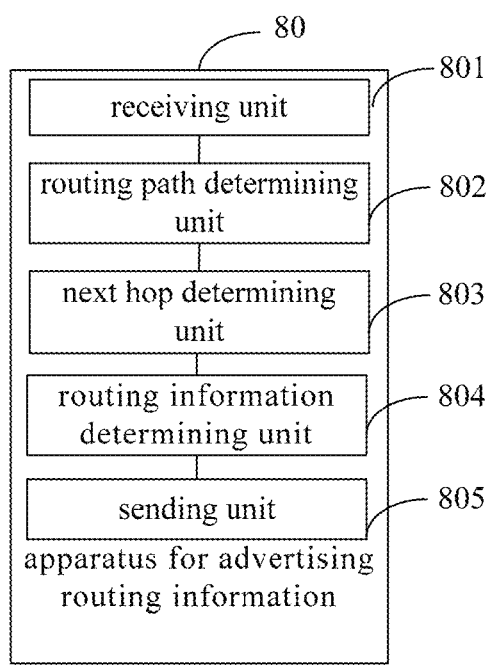
FIG. 8 is a schematic diagram of a structure of an apparatus for advertising routing information provided by an embodiment of the present application.

In an aspect, as shown in FIG. 8, an apparatus 80 for advertising routing information provided by an embodiment of the present invention is used for implementing the method for advertising routing information as shown in FIG. 4, and the apparatus 80 includes:

a receiving unit 801, configured to receive first routing information sent by a first forwarding device, where the first routing information includes an identifier of the first forwarding device;

a routing path determining unit 802, configured to determine a first routing path according to the identifier of the first forwarding device transmitted by the receiving unit 801, an identifier of a second forwarding device and a routing path group;

a next hop determining unit 803, configured to determine a next hop in second routing information for the second forwarding device according to the first routing path transmitted by the routing path determining unit 802;

a routing information determining unit 804, configured to obtain the second routing information for the second forwarding device at least according to the next hop in the second routing information for the second forwarding device transmitted by the next hop determining unit 803; and a sending unit 805, configured to advertise the second routing information for the second forwarding device transmitted by the routing information determining unit 804 to the second forwarding device.

Further, the next hop determining unit 803 may be specifically configured to determine an identifier of an adjacent node before the second forwarding device on the first routing path as the next hop in the second routing information for the second forwarding device.

According to the apparatus for advertising routing information provided by the embodiment of the present application, the next hop in the second routing information for the receiver is determined according to the identifier of the sender of the first routing information, the identifier of the receiver and the routing path group, the second routing information for the receiver is sent to the receiver, and the second routing information for the receiver includes the next hop in the second routing information for the receiver, so that the next hop is determined at the control device side according to the routing path, and then the routing information is advertised at the control device side according to the routing path, which reduces operation complexity of the forwarding device and reduces operation and maintenance workload. The problems of complicated operation of the forwarding device and large network maintenance workload caused by determining the next hop at the forwarding device side in the prior art are solved.

Figure 9:
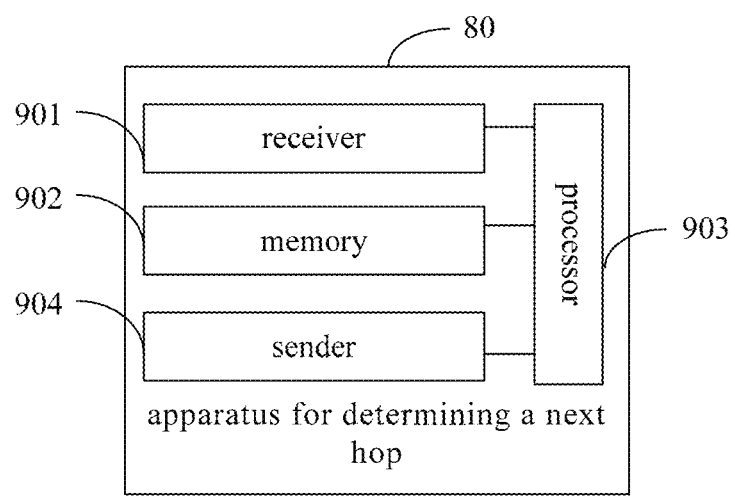
FIG. 9 is a schematic diagram of a structure of another apparatus for advertising routing information provided by an embodiment of the present application.

In an aspect, as shown in FIG. 9, an apparatus 80 for advertising routing information provided by an embodiment of the present invention is used for implementing the method for advertising routing information as shown in FIG. 4, and the apparatus 80 includes: a receiver 901, a memory 902, a processor 903 and a sender 904, and the receiver 901, the memory 902 and the sender 904 are respectively connected with the processor 903, where, the receiver 901 is configured to receive first routing information sent by a first forwarding device, where the first routing information includes an identifier of the first forwarding device;

the memory 902 is configured to store a group of codes, where the codes are used for controlling the processor 903 to perform the following operations:

determining a first routing path according to the identifier of the first forwarding device, an identifier of a second forwarding device and a routing path group;

determining a next hop in second routing information for the second forwarding device according to the first routing path; and obtaining the second routing information for the second forwarding device at least according to the next hop in the second routing information for the second forwarding device;

the sender 904 is configured to advertise the second routing information for the second forwarding device to the second forwarding device.

According to the apparatus for advertising routing information provided by the embodiment of the present application, the next hop in the second routing information for the receiver is determined according to the identifier of the sender of the first routing information, the identifier of the receiver and the routing path group, the second routing information for the receiver is sent to the receiver, and the second routing information for the receiver includes the next hop in the second routing information for the receiver, so that the next hop is determined at the control device side according to the routing path, and then the routing information is advertised at the control device side according to the routing path, which reduces operation complexity of the forwarding device and reduces operation and maintenance workload. The problems of complicated operation of the forwarding device and large network maintenance workload caused by determining the next hop at the forwarding device side in the prior art are solved.

Those skilled in the art may clearly understand that, for convenience and simplicity of description, the specific working processes of the apparatus and units described above may refer to corresponding processes in the foregoing method embodiments, and will not be repeated redundantly herein.

In the several embodiments provided in the present application, it should be understood that, the disclosed apparatus and method may be implemented in other manners. For example, the apparatus embodiments described above are merely exemplary, e.g., the division of the units is only a logic function division, other division manners may exist in practical implementation, for example, a plurality of units or components may be combined, or some features may be omitted or not implemented. From another point of view, the displayed or discussed mutual coupling or direct coupling or communication connection may be indirect coupling or communication connection of apparatus or units through some interfaces, and may be in electrical, mechanical or other forms.

The units described as separate components may be separated physically or not, components displayed as units may be physical units or not, namely, the components may be located in one place, or may be advertised on a plurality of network units. A part of or all of the units may be selected to achieve the purposes of the technical solutions in the embodiments according to actual demand.

In addition, the functional units in the embodiments of the present application may be integrated in a processing unit, or the units singly exist physically, or two or more units are integrated in one unit. The above-mentioned integrated unit may be achieved in the form of hardware and may also be achieved in the form of hardware and a software functional unit.

The above-mentioned integrated unit achieved in the form of software functional unit may be stored in a computer readable storage medium. The above-mentioned software functional unit is stored in a storage medium, and includes a plurality of instructions for enabling a computer device (may be a personnel computer, a server, or a network device, etc.) to execute a part of the steps of the methods in the embodiments of the present application. The foregoing storage medium includes a variety of media capable of storing program codes, such as a USB disk, a mobile hard disk, a read-only memory (ROM), a random access memory (RAM), a magnetic disk, an optical disk or the like.

Finally, it should be noted that the above-mentioned embodiments are merely used for illustrating the technical solutions of the present application, rather than limiting them; although the present application has been described in detail with reference to the foregoing embodiments, those of ordinary skill in the art should understand that they could still make modifications to the technical solutions recorded in the foregoing embodiments or make equivalent substitutions to a part of technical features therein; and these modifications or substitutions do not make the essence of the corresponding technical solutions depart from the spirit and scope of the technical solutions of the embodiments of the present application.

What is claimed is:

1. A method for determining a next hop, comprising:

receiving, by a control device, first routing information sent by a first forwarding device, wherein the first routing information comprises an identifier of the first forwarding device;

determining a first routing path according to the identifier of the first forwarding device, an identifier of a second forwarding device and a routing path group, wherein the first routing path includes the identifier of the first forwarding device and the identifier of the second forwarding device, and the first routing path is included in the routing path group; and determining a next hop in second routing information for the second forwarding device according to the first routing path, wherein the second forwarding device is a receiver of the second routing information advertised by the control device.

2. The method according to claim 1, wherein the determining the next hop in the second routing information for the second forwarding device according to the first routing path, comprises:

determining an identifier of an adjacent node before the second forwarding device on the first routing path as the next hop in the second routing information for the second forwarding device.

3. The method according to claim 1, wherein the determining the first routing path according to the identifier of the first forwarding device, the identifier of the second forwarding device and the routing path group, comprises:

selecting a routing path comprising the identifier of the first forwarding device and the identifier of the second forwarding device in the routing path group as the first routing path.

4. The method according to claim 1, wherein before the determining the first routing path according to the identifier of the first forwarding device, the identifier of the second forwarding device and the routing path group, the method further comprises:

determining the routing path group according to a network topology within a preset range.

5. The method according to claim 4, wherein the determining the routing path group according to the network topology within the preset range, comprises:

determining the routing path group according to the network topology within the preset range and a constraint condition, wherein the constraint condition comprises one of a path length constraint and a bandwidth constraint.

6. The method according to claim 4, wherein when the network topology within the preset range is updated, the determining the routing path group according to the network topology within the preset range, comprises:

determining the routing path group according to the updated network topology.

7. A method for advertising routing information, comprising:

receiving, by a control device, first routing information sent by a first forwarding device, wherein the first routing information comprises an identifier of the first forwarding device;

determining a first routing path according to the identifier of the first forwarding device, an identifier of a second forwarding device and a routing path group, wherein the first routing path includes the identifier of the first forwarding device and the identifier of the second forwarding device, and the first routing path is included in the routing path group;

determining a next hop in second routing information for the second forwarding device according to the first routing path; and obtaining the second routing information for the second forwarding device at least according to the next hop in the second routing information for the second forwarding device, and advertising the second routing information for the second forwarding device to the second forwarding device.

8. The method according to claim 7, wherein the determining the next hop in the second routing information for the second forwarding device according to the first routing path, comprises:

determining an identifier of an adjacent node before the second forwarding device on the first routing path as the next hop in the second routing information for the second forwarding device.

9. An apparatus for determining a next hop, comprising:

a receiver, configured to receive first routing information sent by a first forwarding device, wherein the first routing information comprises an identifier of the first forwarding device; and a processor, configured to determine a first routing path according to the identifier of the first forwarding device, an identifier of a second forwarding device and a routing path group, wherein the first routing path includes the identifier of the first forwarding device and the identifier of the second forwarding device, and the first routing path is included in the routing path group; and determine a next hop in second routing information for the second forwarding device according to the first routing path, wherein the second forwarding device is a receiver of the second routing information advertised by the apparatus.

10. The apparatus according to claim 9, wherein the processor is configured to determine an identifier of an adjacent node before the second forwarding device on the first routing path as the next hop in the second routing information for the second forwarding device.

11. The apparatus according to claim 9, wherein the processor is configured to select a routing path comprising the identifier of the first forwarding device and the identifier of the second forwarding device in the routing path group as the first routing path.

12. The apparatus according to claim 9, wherein the processor is further configured to determine the routing path group according to a network topology within a preset range.

13. The apparatus according to claim 12, wherein the processor is configured to determine the routing path group according to the network topology within the preset range and a constraint condition, wherein the constraint condition comprises one of a path length constraint and a bandwidth constraint.

14. The apparatus according to claim 12, wherein the processor is configured to determine the routing path group according to an updated network topology, when the network topology within the preset range is updated.

15. An apparatus for advertising routing information, comprising:

a receiver, configured to receive first routing information sent by a first forwarding device, wherein the first routing information comprises an identifier of the first forwarding device;

a processor, configured to determine a first routing path according to the identifier of the first forwarding device, an identifier of a second forwarding device and a routing path group, wherein the first routing path includes the identifier of the first forwarding device and the identifier of the second forwarding device, and the first routing path is included in the routing path group; determine a next hop in second routing information for the second forwarding device according to the first routing path; and obtain the second routing information for the second forwarding device at least according to the next hop in the second routing information for the second forwarding device; and a transmitter, configured to advertise the second routing information for the second forwarding device to the second forwarding device.

16. The apparatus according to claim 15, wherein the processor is configured to determine an identifier of an adjacent node before the second forwarding device on the first routing path as the next hop in the second routing information for the second forwarding device.

\* \* \* \* \*